United States Patent [19]

Kurakake et al.

[11] Patent Number: 4,747,157
[45] Date of Patent: May 24, 1988

[54] SPATIAL PRODUCT SUM CALCULATING UNIT

[75] Inventors: Mitsuo Kurakake; Shoichi Otsuka, both of Hino, Japan

[73] Assignee: Fanuc Ltd., Minamitsuru, Japan

[21] Appl. No.: 945,790

[22] PCT Filed: Apr. 14, 1986

[86] PCT No.: PCT/JP86/00185
§ 371 Date: Dec. 3, 1986
§ 102(e) Date: Dec. 3, 1986

[87] PCT Pub. No.: WO86/06187
PCT Pub. Date: Oct. 23, 1986

[30] Foreign Application Priority Data

Apr. 18, 1985 [JP] Japan .................. 60-83334

[51] Int. Cl.⁴ .............................. G06K 9/36
[52] U.S. Cl. ...................... 382/41; 358/37;
358/166; 358/284; 382/54; 382/49
[58] Field of Search .................. 358/36, 37, 166, 167,
358/284; 382/41, 54, 49

[56] References Cited

U.S. PATENT DOCUMENTS 3,905,045  9/1975  Nickel ................................. 382/41
4,550,437  10/1985  Kobayashi et al. ................ 382/41

FOREIGN PATENT DOCUMENTS 58-51376  3/1983  Japan .

Primary Examiner—Edward L. Coles, Sr.
Assistant Examiner—Michael D. Parker
Attorney, Agent, or Firm—Staas & Halsey

[57] ABSTRACT

The present invention is directed to an arithmetic which calculates the spatial product sum of each of a plurality of picture element data stored in a frame memory, through utilization of load coefficients with N rows and N columns stored in a coefficient memory. The results of calculation for pieces of picture element data of one row of the frame memory and load coefficients of one row are added to the contents of shift registers corresponding to picture elements. This operation is repeated N times for different rows of the frame memory and different load coefficients. Thus, the spatial product sum calculation is performed at high speed using a small number of multipliers.

1 Claim, 7 Drawing Sheets

DIAGRAM EXPLANATORY OF THE CONSTITUTION OF THE PRESENT INVENTION

DIAGRAM EXPLANATORY OF THE CONSTITUTION OF THE PRESENT INVENTION

DIAGRAM SHOWING THE ARRANGEMENT OF PICTURE ELEMENT DATA, FOR EXPLAINING THE OPERATION OF THE PRESENT INVENTION

FIG. 3. BLOCK DIAGRAM OF THE PRINCIPAL PART OF AN EMBODIMENT

TIMING CHART OF THE EMBODIMENT

TIMING CHART OF THE EMBODIMENT

TIMING CHART OF THE EMBODIMENT

DIAGRAM EXPLANATORY OF SPATIAL PRODUCT SUM
CALCULATION WITH 3 ROWS AND COLUMNS

BLOCK DIAGRAM OF A CONVENTIONAL DEVICE

BLOCK DIAGRAM OF A CONVENTIONAL DEVICE

SPATIAL PRODUCT SUM CALCULATING UNIT

TECHNICAL FIELD

The present invention relates to a spatial product sum calculating unit, and more particularly to an arithmetic unit suitable for calculating the spatial product sum of each of a plurality of picture element data stored in a frame memory.

BACKGROUND ART

For the purpose of, for example, vividifying an image obtained by image sensing of an object with an imaging device, a spatial product sum calculation (a convolution) is performed for each picture element data of one frame which is a candidate for processing.

FIG. 7 is a diagram explanatory of a spatial product sum calculation with 3 rows and 3 columns. Where picture element data $F_{i,j}$ and load coefficients $W_{i,j}$ are arranged as shown, the result calculated of the spatial product sum, $G_{2,2}$, for picture element data $F_{2,2}$ is given by the following equation:

$$G_{2,2} = \sum_{i=1}^{3} \sum_{j=1}^{3} W_{i,j} \times F_{i,j} \quad (1)$$

For convenience of description, calculations $W_{1,1} \times F_{1,1} + W_{2,1} \times F_{2,1} + W_{3,1} \times F_{3,1}$, $W_{1,2} \times F_{1,2} + W_{2,2} \times F_{2,2} + W_{3,2} \times F_{3,2}$, and $W_{1,3} \times F_{1,3} + W_{2,3} \times F_{2,3} + W_{3,3} \times F_{3,3}$ in Eq. (1) will hereinafter be referred to as first, second and third calculations, respectively.

Conventionally, such a spatial product sum calculation as mentioned above is conducted through use of, for example, such devices as shown in FIGS. 8 and 9. The device depicted in FIG. 8 comprises one multiplier 1 and one integrator 2, in which the data $F_{i,j}$ and the load coefficient $W_{i,j}$ are sequentially entered into the one and the other input of the multiplier 1 to obtain $F_{i,j} \times W_{i,j}$ and the results of a total of nine calculations are integrated by the integrator 2.

The device shown in FIG. 9 comprises a total of nine multipliers $3_1$ to $3_g$ and one adder 4, in which the multipliers receive the data $F_{i,j}$ at one input and the different load coefficients $W_{i,j}$ at the other input and perform parallel processing, the results of which are added together by the adder 4.

The device shown in FIG. 8 is small in the number of parts used, but requires much time for the spatial product sum calculation for each picture element data, and hence it is not suited for the calculation of the spatial product sums of, for example, $256 \times 256$ picture elements.

The unit depicted in FIG. 9 is capable of calculating the spatial product sum of each picture element data at a speed around nine times higher than the above device, but employs as many as nine bulky and expensive multipliers, and hence it is inevitably costly and large-sized, in general.

SUMMARY OF THE INVENTION

An object of the present invention is to provide an arithmetic unit which permits a relatively high-speed calculation of the spatial produce sum for each of a plurality of picture element data stored in a frame memory, through use of a reduced number of multipliers.

According to the present invention, the above object is achieved by providing an arithmetic unit such, for example, as shown in FIG. 1, which calculates the spatial product sum for each of a plurality of picture element data stored in a frame memory 10, through utilization of load coefficients with N rows and N columsn prestored in a coefficient memory 12, and which comprises:

a first shift register having N stages;

N registers $13_1$ to $13_n$ for setting therein N load coefficients;

N multipliers $14_1$ to $14_n$ for multiplying the outputs of the registers $13_1$ to $13_n$ and the corresponding stages $11_1$ to $11_n$ of the first shift register 11;

a first adder for adding together the outputs of the N multipliers $14_1$ to $14_n$;

a second shift register 17 having stages of the same number as the pieces of picture element data stored in the frame memory 10 in the row direction;

a second adder 16 for adding together the outputs of the first adder 15 and the second shift register 17, the added output being applied to the second shift register 17; and a control circuit 18 which sets the load coefficients of one row of the coefficient memory 12 in the N register $13_1$ to $13_n$ and effects control for all the rows of the coefficient memory 12 so that the pieces of picture element data in the frame memory 10, corresponding to the load coefficients set in the N registers, are fed into the first register 11 in sequence, whereby data which is output from the second multiplier 16 during the above-mentioned control for the row of the coefficient memory 12 is obtained as the result of calculation of the spatial product sum for each of the pieces of picture element data of one row which are candidates for processing.

The operation of the present invention will be described in connection with a spatial product sum calculation with 3 rows and 3 columns. In this instance, the first shift register 11 has three stages and three registers $13_1$ to $13_3$ are employed (though the register $13_3$ is not shown). Let it be assumed that a total of $256 \times 256$ pieces of picture element data $F_{x,y}$ are sored in the frame memory 12 in such an order as shown in FIG. 2, that the pieces of picture element data on the second through 254th rows are candidates for processing, and that the load coefficients $W_{i,j}$ are arranged as depicted in FIG. 7.

The operation starts with the setting of the load coefficients $W_{3,1}$, $W_{2,1}$ and $W_{1,1}$ in the three registers $13_1$ to $13_3$, followed by setting the picture element data $F_{0,0}$ and $F_{1,0}$ in the second and first stages of the first shift register 11, respectively. In consequence, the first adder 15 provides the result of the first calculation for the picture element data $F_{0,1}$, which is fed into the second shift register 17 because the second adder 16 is so adapted as not to add the output of the second shift register during the processing of the first row.

Next, the picture element data $F_{2,0}$ is brought into the first stage of the first shift register 11, and the contents of the first and second stages are shifted into the second and third stages, respectively. As a result of this, the adder 16 outputs the result of the first calculation for the picture element data $F_{1,1}$, which is entered into the second shift register 17.

Thereafter, the picture element data $F_{3,0}$ to $F_{255,0}$ are introduced into the first stage of the first shift register 11 one after another, by which the result of the first calculation for each of the picture element data F0,1 to F255,1 is set in the second register 17.

Next, the additive operation of the second adder 16 is started, the load coefficients W3,2, W2,2 and W1,2 are set in the three registers $13_1$ to $13_3$, and the picture element data F0,1 and F1,1 are set in the second and first stages of the first shift register 11, respectively. In consequence, the first adder 15 yields the result of the second calculation for the picture element data F0,1, which is applied to the second adder 16, wherein it is added to the result of the first calculation for the picture element data F0,1 set in the second shift regiser 17, and the added value is fed back to the second shift register 17. By conducting such an operation for each picture element data on the first row, the contents of the second shift register 17 represent the sum of the results of the first and second calculations for the picture element data F0,1 to F255,1.

Next, the load coefficients W3,3, W2,3 and W1,3 are set in the three registers $13_1$ to $13_3$ and the picture element data F1,2 and F0,2 are set in the first and second stages of the first shift register 11. Then, the first adder 15 provides the result of the third calculation on the picture element data F0,1, which is applied to the second adder 16 for addition to the sum of the results of first and second calculations on the picture element data F0,1 set in the second shift register 17, and the result G0,1 of the calculation on the spatial product sum for the picture element F0,1 is provided to the control circuit 18. Similarly, by shifting the picture element data F0,1 to F255,1 in sequence into the second stage of the first shift register 11, the results G0,1 to G255,1 of spatial product sum calculations for the picture element data F0,1 to F255,1 are obtained from the second adder 16.

Thus, the calculation of the spatial product sum for each picture element data in the first row is completed, and the same calculation is carried out for the picture element data in the second and subsequent rows.

BEST MODE FOR CARRYING OUT THE INVENTION

Figure 3:
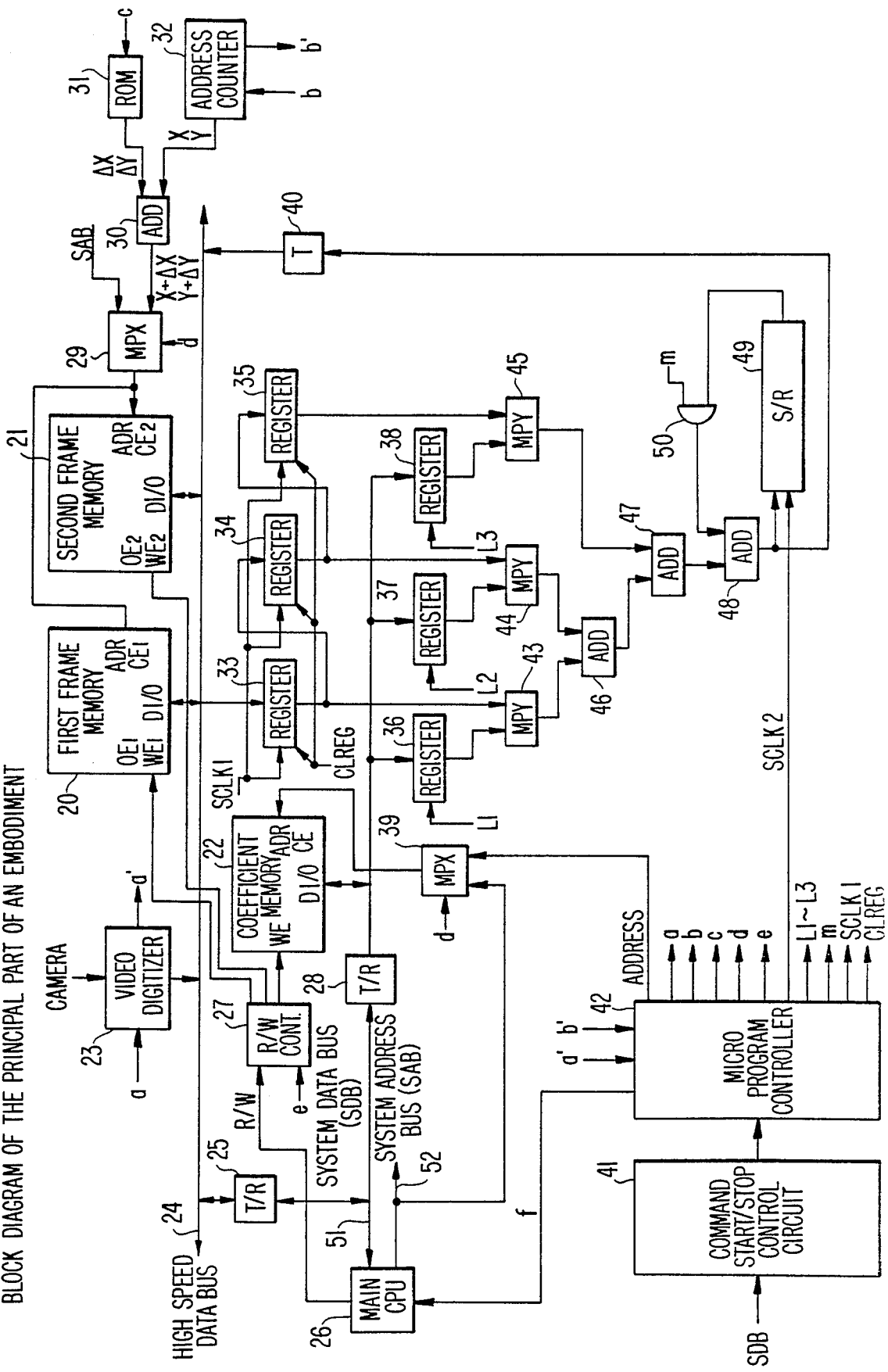
FIG. 3 is a block diagram of the principal part of an embodiment of the present invention.

FIG. 3 is a block diagram of the principal part of an embodiment of the present invention, showing an example in which a spatial product sum calculation with 3 rows and 3 columns is performed for each of picture element data in first to 254th rows of a first frame memory 20 which stores 256×256 pieces of picture element data, and the results of the calculations are stored in a second frame memory 21 at corresponding addresses.

In FIG. 3, the first and second frame memories 20 and 21 respectively each have addresses with 256 rows an 256 columns, data input/output terminals DI/O connected to a high-speed data bus 24, address terminals ADR and chip select terminals $CE_1$ and $CE_2$ connected to the output of a multiplexer 29, and write enable terminals $WE_1$ and $WE_2$ and output enable terminals $OE_1$ and $OE_2$ connected to a memory read/write control circuit 27. The first and second frame memories 20 and 21 each store data (of eight bits, for example) via the data input/output terminal DI/O at an address specified by the input to the address terminal ADR when the input to the write enable terminal WE is a "1" or high, and provides data at a specified address on the high-speed data bus 24 when the input to the output enable terminal OE is at the "1" level or high.

Registers 33 to 35 constitute a first register, the register 33 forming a first stage, the register 34 second stage, and the register 35 a third stage. Picture element data read out of the first frame memory 20 is set in the first stage register 33, from which it is shifted by a shift clock SCLK1 to the second and third stage register 34 and 35 one after the other. The outputs of the registers 33 to 35 are provided to multipliers 43 to 45 at one input thereof. Reference character CLREG indicates a clear signal for clearing each of the registers 33 to 35 to zero.

Figure 7:
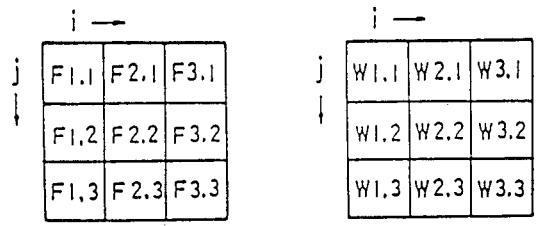
FIG. 7 is a diagram explanatory of a spatial product sum calculation with 3 rows and 3 columns.
Figure 8:
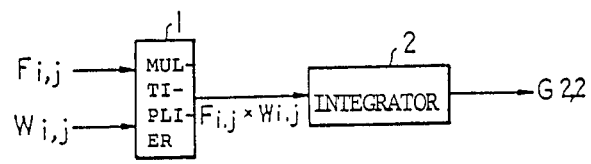
FIGS. 8 and 9 are diagrams explanatory of conventional spatial product sum calculating units.
Figure 9:
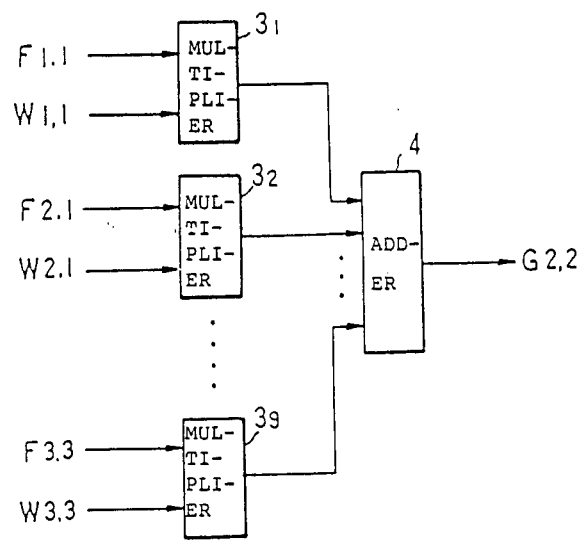

A coefficient memory 22 is a RAM for storing such load coefficients Wi,j as shown in FIG. 7, and its data input/output terminal DI/O is connected to a system data bus (SDB) of a main CPU 26 via a receiver 28 and to registers 33 through 38. Further, the coefficient memory 22 has its address terminal ADR and chip select terminal CE connected to a multiplexer 39 and its write enable terminal WE and output enable terminal OE connected to the memory read/write control circuit 27.

The registers 36 to 38 store the load coefficients Wi,j read out of the coefficient memory 22, at the timing of load control signals L1 to L3, and their outputs are applied to the other inputs of the multipliers 43 to 45.

The multipliers 43 to 45 multiply the two pieces of data input thereto and provide their multiplied outputs to an adder 46, wherein they are added together, the added output being applied to one input of an adder 47. To the other input of the adder 47 is applied the output of the multiplier 47, which is added to the output from the adder 46, the added output being provided to an adder 48. The adders 46 and 47 make up a first adder.

The adder 48 constitutes a second adder, which adds together the outputs from he adder 47 and an AND circuit 50 and applies the added output to a shift register 49 forming a second shift register and, at the same time, provides the output of the high-speed data bus 24 via a data transmitter 40.

The shift register 49, in this embodiment, has stages of the same number as the 256 pieces of picture element data and shifts its contents one place to the right upon each application thereto of a shift clock SCLK2, and the data thus output one by one from the shift register 49 is applied to the other input of the adder 48 via the AND circuit 50. Further, the shift register 49 enters therein the output from the adder 48 upon each application of the shift clock SCLK2.

The main CPU 26 has a system data bus 51 and a system address bus (SAB) 52. The system data bus 51 is connected to the high-speed data bus 24 and the coefficient memory 22 via data transmitters/receivers 25 and 28 and to a command start/stop control circuit 41 which controls a microprogram controller 42, while the system address bus 52 is connected to the multiplexers 29 and 39. The main CPU 26 transmits a read/write control signal R/W to the memory read/write control circuit 27 and receives from the microprogram controller 42 a signal f indicating the end of processing.

The microprogram controller 42 controls the spatial product sum calculation and supplied the peripheral circuits with signals of such contents as follows:

Signal a: Command for causing a video digitizer 23 to enter a video signal

Signal b: Signal for controlling the loading of a start address of an address counter 32 and the counting-up of an X (row) counter and a Y (column) counter in the address counter 32

Signal c: Control signal for an address offset data memory 31

Signal d: Signal for switching between the multiplexers 29 and 39

Signal e: Control signal for the memory read/write control circuit 27

Signal f: Signal for indicating to the main CPU 26 the completion of processing provided from the control circuit 41

Signals L1 to L3: Load control signals for registers 36 to 38

Signal m: Gate signal for the AND circuit 50, which signal goes low is to disable the AND circuit 50 during the first calculation alone.

Signal SCLK1: Shift clock for the registers 33 to 35

Signal CLREG: Clear signal for the registers 33 to 35

The microprogram controller 42 receives the following signals:

Signal a': Signal from the video digitizer which indicates sampling and its completion Signal b': Signal indicating that the X and Y counters of the address counter 32 have reached predetermined values In FIG. 3, the video digitizer 23 provides on the high-speed bus 24 picture element data obtained by sampling a video signal from a camera such as an ITV (not shown) with a predetermined period. Such a sampling operation takes place in response to the video signal input command a from the microprogram controller 42. During and upon completion of the sampling operation, the video digitizer 23 sends the signal a' to the controller 42.

The address counter 32 includes the X and Y counters, whose outputs X and Y are provided to an adder 30, wherein they are added to offset addresses $\Delta X$ and $\Delta Y$ from the address offset data memory 31, and the added output $X+\Delta X$ and $Y+\Delta Y$ are applied via the multiplexer 29 to the address terminals ADR and the chip select terminals $CE_1$ and $CE_2$ of the first and second frame memories 20 and 21. The adder 30 yields an output "0" when its count value has reached "256".

Next, a description will be given of individual operations of this embodiment.

Input of picture element data, which is a candidate for processing, into the first frame memory 20

For example, when an object to be processed is placed in the visual field of the camera and then the main CPU 26 commands, via the control circuit 41, the microprogram controller 42 to enter picture element data which is a candidate for processing, the controller 42 clears the X and Y counters of the address counter 32 to zero by the signal b, zeroes the offset addresses $\Delta X$ and $\Delta Y$ by the signal c, and switches the multiplexer 29 to the adder 30 by the signal d. Then the controller 42 commands, by the signal a, the video digitizer 23 to enter a video signal.

In response to the command, the video digitizer 23 detects the starting point of the effective area of the video signal (usually, the starting point of a first horizontal scanning line) and thereafter samples the effective area with a predetermined period, providing digital picture element data on the high-speed data bus 24. In this instance, the video digitizer 23 applies to the microprogram controller 42 the signal a' indicating the sampling operation. Upon receipt of this signal, the microprogram controller 42 increments the X counter of the address counter 32 with a predetermined period and provides the signal e to the control circuit 27 to control the level at the read enable terminal $WE_1$ of the first frame memory 20. In consequence, the pieces of picture element data provided on the high-speed data bus 24 from the video digitizer 23 are sequentially stored one by one in the first frame memory 20, starting at a location 0,0. When the picture element data of one row has thus been stored in the first frame memory 20, the controller 42 detects an overflow of the X counter of the address counter 32 by the signal b' and then clears the X counter to zero and incremented the Y counter by one by applying the signal b to them.

When the signal a indicating the sampling operation is applied again to the controller 42 from the video digitizer 23 after a first horizontal flyback period, the same processing as mentioned above is resumed, storing the picture element data in the first row of the first frame memory 20. Such an operation is repeated until the last row of the first frame memory 20 has been reached. When a signal indicating the completion of the entry of the picture element data is delivered from the video digitizer 23 to the controller 42 at the end of the last row, the controller 42 provides the signal f to the main CPU 26 to indicate that the picture element data which is a candidate for processing has been transferred to the first frame memory 20.

Figure 1:
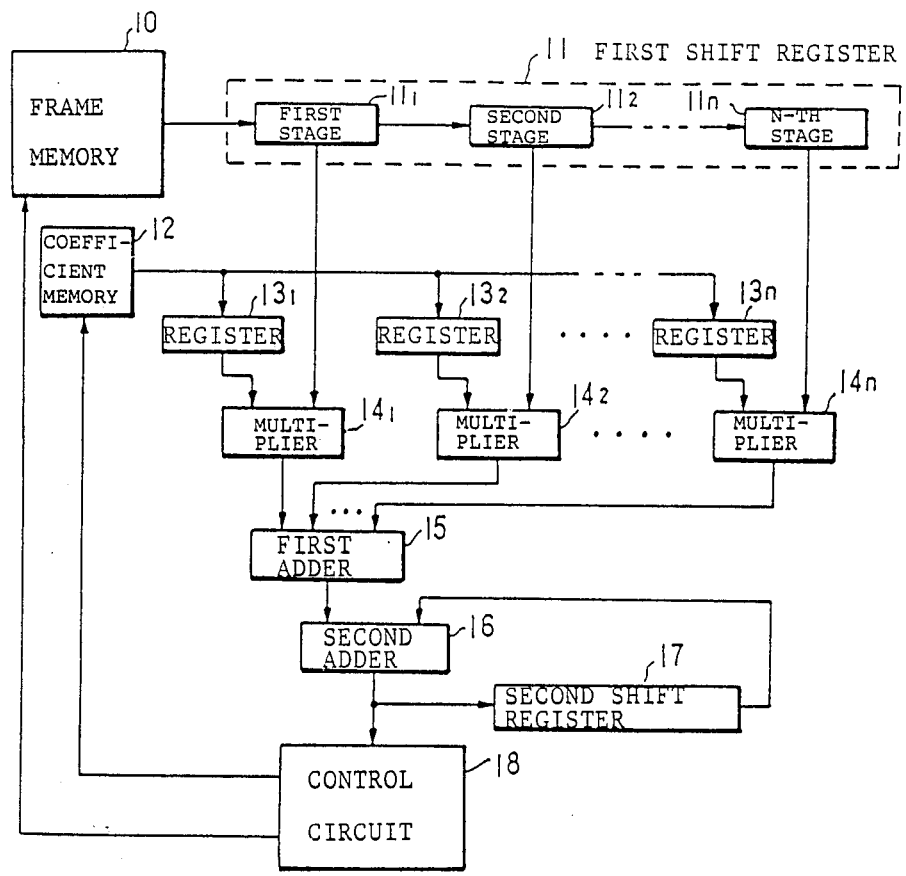
FIG. 1 is a diagram explanatory of the constitution of the present invention.
Figure 2:
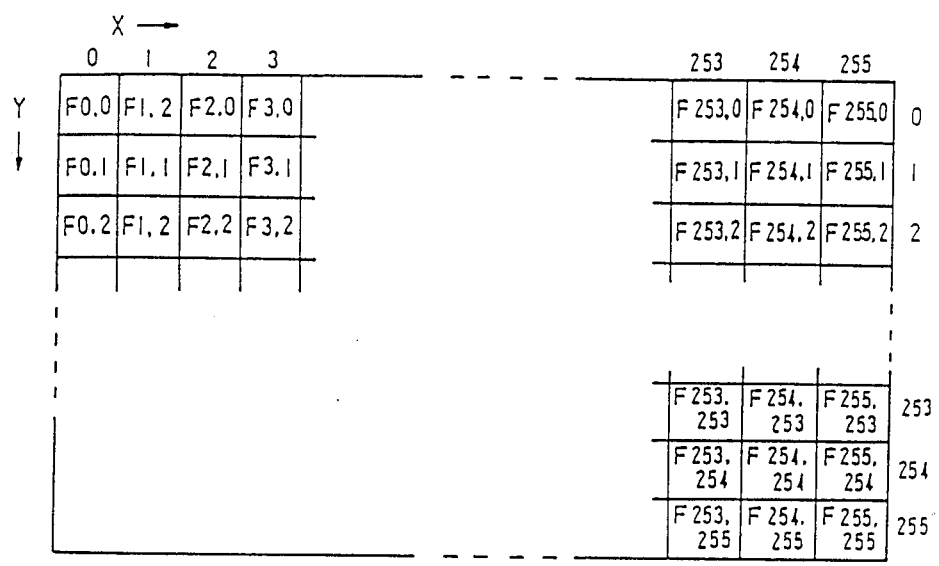
FIG. 2 is a diagram showing the arrangement of picture element data, for explaining the operation of the present invention.

Thereafter, the data of such an arrangement as shown in FIG. 2 is employed as the picture element data stored in the first frame memory 20 through the above process.

Storage of load coefficients in the coefficient memory 22

This is performed by rewriting the contents of the coefficient memory 22 by the main CPU 26 according to the purpose of an operation for making the picture element data sharp and clear, for instance.

In the following, let it be assumed that such load coefficients $W_{i,j}$ as depicted in FIG. 7 are stored in the coefficient memory 22.

Execution of the spatial product sum calculation

This operation is started by the application of a spatial product sum calculation start command from the main CPU 26 to the controller 42 via the control circuit 41.

Figure 4:
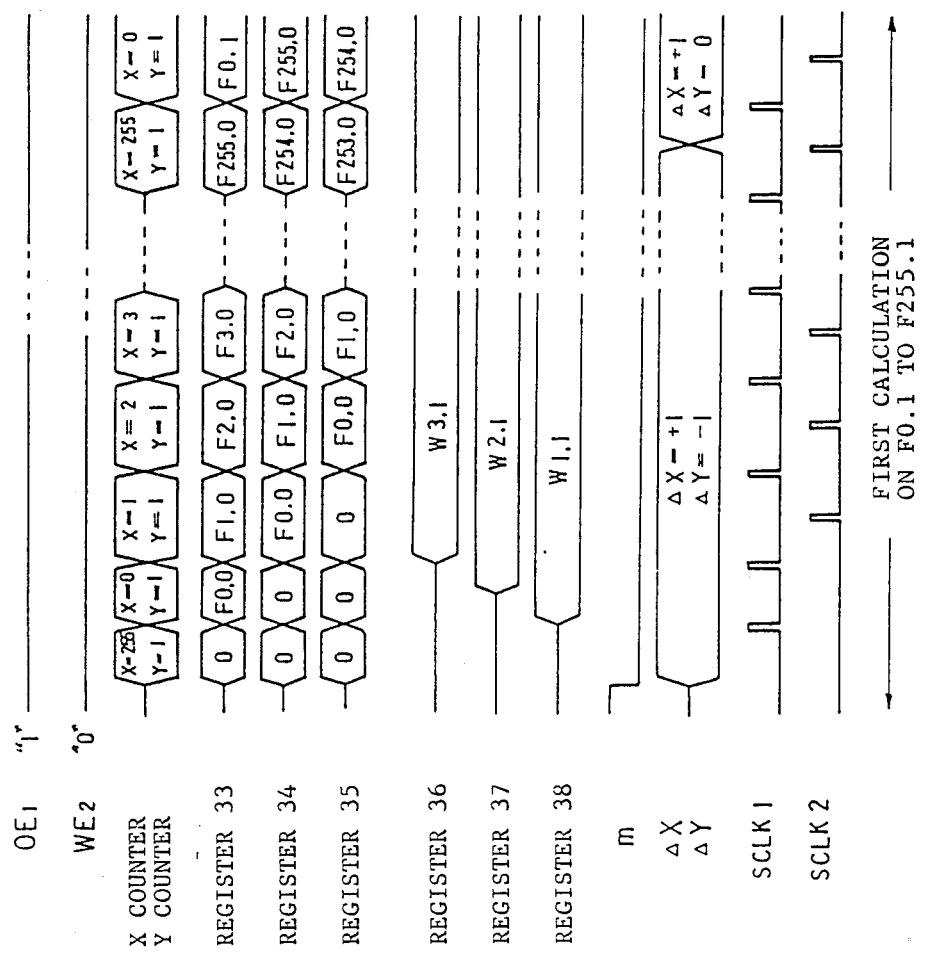
FIGS. 4 through 6 are timing charts showing, by way of example, signal waveforms occurring at respective parts in the device of FIG. 3 during the spatial product sum calculation.
Figure 5:
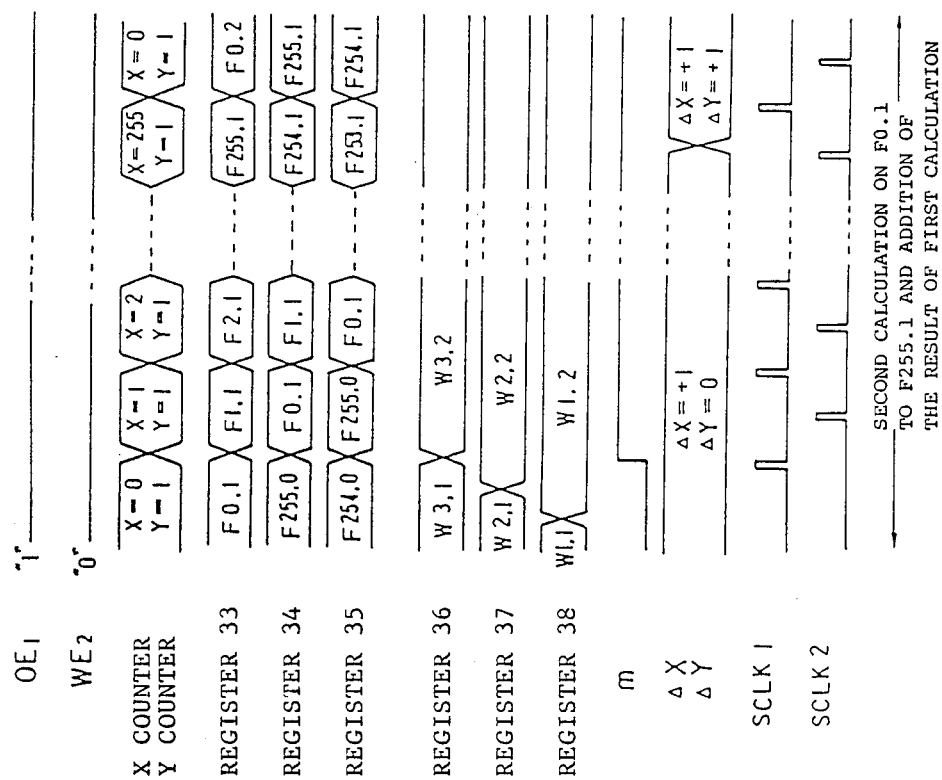
Figure 6:
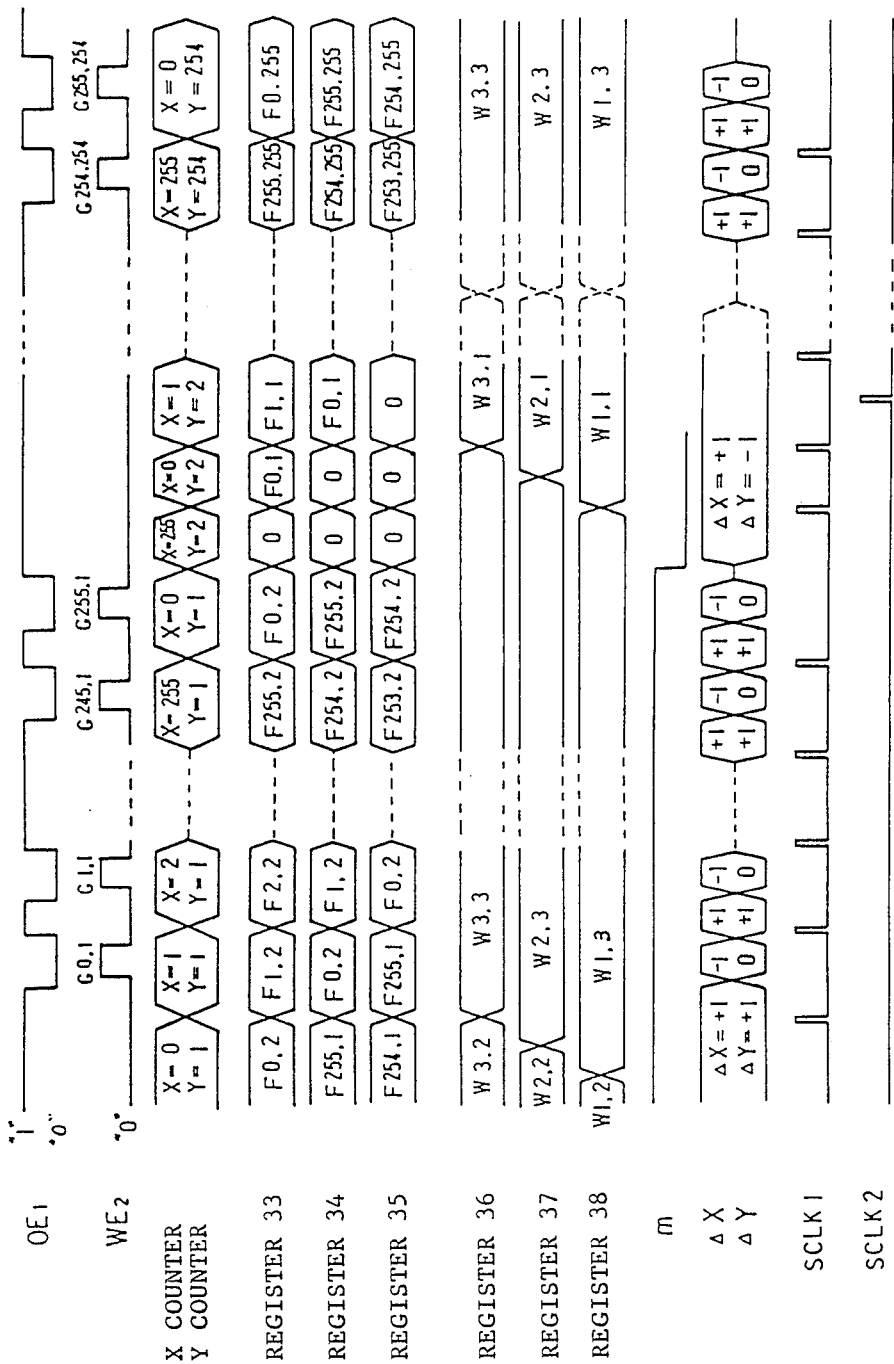

FIGS. 4 through 6 are timing charts showing, by way of example, signal waveforms occurring at respective parts of the arithmetic unit of FIG. 3 in the course of the spatial product sum calculation. FIG. 4 is a timing chart during the period between the start of this operation and the completion of the first calculation for the picture element data F0,1 to F255,1 in the first row of the first frame memory 20, FIG. 5 is a timing chart during the period until the end of the second calculation for the picture element data F0,1 to F255,1 after the first calculation, and FIG. 6 is a timing chart during the period of the third calculation for the picture element data F0,1 to F255,1 and their spatial product sum calculations, followed by spatial product sum calculations for the second and subsequent rows.

Referring to FIG. 4:

When commanded to start the spatial product sum calculation, the controller 42 switches first the multiplexer 29 to the side of the adder 30 and the multiplexer 39 to the side of the controller 42 and clears the contents of the registers 33 through 35 to zero, and then disables the AND circuit 50 as shown in FIG. 4. Further, the controller 42 makes the outputs ΔX and ΔY of the address offset data memory 31 +1 and −1, respectively. Then the controller 42 loads "255" and "1", as initial values, in the X and Y counters of the address counter 32, and at this timing it outputs one shot of the shift clock SCLK1 and places the first frame memory 20 in the read mode. In consequence, the picture element data F0,0 is read out of the first frame memory 20 and set in the register 33. Next, the controller 42 causes the X counter to count up to "0" and outputs the shift clock SCLK1, thereby storing the picture element data F0,0 in the register 34 and the picture element data F1,0 in the register 33. Incidentally, the controller 42 sets the load coefficients W3,1, W2,1 and W1,1 for the first calculation in the registers 36 to 38 before the above processing is finished.

Upon completion of the above operation, the adder 47 outputs the result of calculation for the picture element data F0,1 and the controller 42 delivers the shift clock SLCK2 to load therein the calculation result.

Next, the controller 42 increments the X counter by one, sets the picture element data F2,0 in the register 33, and at the same time applies the shift clock SCLK1 to shift the contents of the register 33 into the register 34 and the contents of the latter into the register 35. Then the first calculation for the picture element data F1,1 is performed, and its result is fed into the shift register 49 by the application of the shift clock SCLK2.

In a similar manner, the picture element data F3,0, F2,0 and F1,0 are set in the registers 33, 34 and 35, and the result of calculation for the picture element data F2,1, which is obtained at this time, is input into the shift register 49 by the shift clock SCLK2.

When the picture element data F255,0, F254,0 and F253,0 have been set in the registers 33, 34 and 35 after the repetition of the above operation for each picture element data, the first calculation for the picture element data F254,1 is carried out, and its result is brought into the shift register 49. Upon completion of this input, the address offset data ΔY is set to "0" and the X counter is counted up, by which the picture element data F0,1, F255,0 and F254,0 are set in the registers 33, 34 and 35, and the first calculation for the picture element data F255,1 is conducted. At the point of time when the calculation has been completed, the results of the first calculations for all the 256 pieces of picture element data F0,1 to F255,1 are stored in the shift register 49.

Referring to FIG. 5:

When detecting that the count value of the X counter has reached "256" ("0" in practice), the controller 42 sets the load coefficients W3,2, W2,2 and W1,2 in the registers 36, 37 and 38, enables the AND circuit 50 to apply therethrough the output of the shift register 49 to the adder 48, and sets the picture element data F1,1, F0,1 and F255,0 in the registers 33, 34 and 35. After this, the second calculation for the picture element data F0,1 is performed and its result is obtained from the adder 47.

Since the result of the first calculation for the picture element data F0,1 is being provided from the shift register 49 via the AND circuit 50 at this time, the output of the adder 47 represents the sum of the results of the first and second calculations for the picture element data F0,1, and this output of the adder 47 is fed by the shift clock SCLK2 into the shift register 49.

Similarly, upon setting of the picture element data F2,1, F1,1 and F0,1 in the registers 33, 34 and 35, the second calculation for the picture element data F1,1 and the addition of its result to that of the first calculation are conducted, and the result of the addition is entered into the shift register 49. Thereafter, such operations are carried out for each picture element data. When the picture element data F255,1, F254,1 and F253,1 have been set in the registers 33, 34 and 35, the sum of the results of the first and second calculations for the picture element data F254,1 are set in the shift register 49. At this time, the controller 42 detects that the count value of the X counter has reached "255" and causes it to count up to zero, changes the address offset data ΔY to "+1", sets the picture element data F0,2, F255,1 and F254,1 in the registers 33, 34 and 35, and sets the sum of the results in the first and second calculations for the picture element data 255,1 in the shift register 49. Upon completion of this setting, the sums of the results of the first and second calculations for the picture element data F0,1 through F255,1 are stored in the shift register 49.

Referring to FIG. 6:

On termination of the above process, the controller 42 sets the load coefficients W3,3, W2,3 and W1,3 in the registers 36, 37 and 38 and sends the shift clock SCLK1 to the registers 33, 34 and 35 to set therein the picture element data F1,2, F0,2 and F255,1. In consequence of this, the result of the third calculation for the picture element data F0,1 appears at the output of the adder 47 and the result of the spatial product sum calculation for the picture element data F0,1 at the output of the adder 48. At the timing when the result of the spatial product sum calculation for the picture element data F0,1 has appeared in the adder 48, the controlled 42 makes the address offset data ΔX and ΔY "−1" and "0", respectively, and applies an input "1" to the write enable terminal WE of the second frame memory 21, thereby storing therein the spatial product sum calculation result G0,1 in a first row, zeroth column location (corresponding to the picture element data F0,1).

Upon completion of this process, the controller 42 makes both of the address offset data ΔX and ΔY "+1" again, increments the X counter by one, and performs the spatial product sum calculation for the picture element data F,1. Then, as in the case with the above, the controller 42 alters the address offset data ΔX to "−1" and ΔY to "0", and at the same time applies an input "1" to the write enable terminal WE, storing the spatial product sum calculation result G1,1 in the first row, first column of the second frame memory 21. Such processing is repeated until the spatial product sum calculation result G255,1 has been stored in the second frame memory 21, thus completing the process for the picture element data in the first row of the first frame memory 20. In the case of storing the spatial product sum calculation result G255,1 in the second frame memory 21, the sum X+ΔX is "255" because the data ΔX is "−1" although the X address counter indicates "0".

When the X counter goes to "0" at the end of this process, the controller 42 initiates the processing for the second row of the first frame memory 20. That is, the controller 42 clears the registers 33 through 35 to zero, disables the AND circuit 50, sets the address offset data $\Delta X$ and $\Delta Y$ to "+1" and "−1", respectively, increments the Y counter by one, and sets the picture element data F0,1 in the register 33. Further, the controller 42 sets the load coefficients W3,1, W2,1 and W1,1 in the registers 36, 37 and 38, sets the picture element data F1,1 in the register 33 and, at the same time, sets the picture element data F0,1 in the register 34 by the shift block SCLK1. By this, the first calculation for the picture element data F0,2 is carried out and its result is obtained in the adder 47. Thereafter, the spatial product sum calculation for each picture element data in the second and subsequent rows are conducted through the same processing as for the first row.

When the result of the spatial product sum calculation for the picture element data F255,254 in the 254th row, 255th column of the first frame memory 20 has been stored in the 254th row, 255th column of the second frame memory 21, the controller 42 indicates, by the signal f, the completion of the spatial product sum calculation to the main CPU 26.

Recognition of the results of spatial product sum calculations by the main CPU 26

On receiving a stop instruction from the main CPU 26 via the control circuit 41, the controller 42 switches the multiplexers 29 and 39 to the side of the system address bus 52. As a result of this, the main CPU 26 is enabled to access the second frame memory 21 and reads out therefrom and recognizes the results of calculations via the data transmitter/receiver 25.

While in the above the present invention has been described as being applied to an arithmetic unit for performing a spatial product sum calculation with three rows and three columns, the invention is also applicable to spatial product sum calculations with five rows and five columns, seven rows and seven columns, etc.

As described above, according to the present invention, since a spatial product sum calculation with N rows and N columns can be implemented by N multipliers, the device therefor can be made low-cost and small-sized. Moreover, since the spatial product sum calculation for picture element data of a certain row starts with the first calculation by shifting the first shift register, followed by the second and third calculations for picture element data of the same row, there can also be produced the effect of manipulating picture element data of one frame at a higher speed than in the case where the spatial product sum calculation is conducted for in each picture elements.

We claim:

1. A spatial product sum calculating unit which calculates the spatial product sum of each of a plurality of picture element data stored in a frame memory, through utilization of load coefficients with N rows and N columns prestored in a coefficient memory, characterized by the provision of:

a first shift register having N stages;

N registers for setting therein N load coefficients;

N multipliers for multiplying the outputs of the registers and the outputs of the corresponding stages of the first shift register;

a first adder for adding the outputs of the N multipliers;

a second shift register having stages of the same number as the plurality of picture element data stored in the frame memory in the row direction;

a second adder for adding the outputs of the first adder and the second shift register, the added output being applied to the second shift register; and a control circuit which sets the load coefficients of one row in the N registers from the coefficient memory and effects control for all the rows of the coefficient memory so that the plurality of picture element data in the frame memory, corresponding to the load coefficients set in the N registers, are entered into the first shift register in a sequential order, whereby data which is output from the second adder during the control for the last row of the coefficient memory is obtained as the result of the spatial product sum calculation for each of the plurality of picture element data of one row which are candidates for processing.

* * * * *

UNITED STATES PATENT AND TRADEMARK OFFICE
CERTIFICATE OF CORRECTION

PATENT NO. : 4,747,157               Page 1 of 3
DATED    : May 24, 1988
INVENTOR(S) : Kurakake et al.

It is certified that error appears in the above-identified patent and that said Letters Patent is hereby corrected as shown below:

On the Title Page:

[73] "Ltd.," s/b --Ltd,--

Col. 1, line 20, "calculated" s/b --calculation--

Col. 2, line 4, "columsn" s/b --columns--
line 31, after "the" (first occurrence) insert --last--
line 42, "sored" s/b --stored--

Col. 3, line 12, "regiser" s/b --register--

Col. 4, line 2, "an" s/b --and--
line 50, "he" s/b --the--

Col. 5, line 6, "f" s/b --$\underline{f}$-- line 10, "a" s/b --$\underline{a}$-- line 12, "b" s/b --$\underline{b}$-- line 16, "c" s/b --$\underline{c}$-- line 18, "d" s/b --$\underline{d}$-- line 20, "e" s/b --$\underline{e}$-- line 22, "f" s/b --$\underline{f}$-- line 27, "m" s/b --$\underline{m}$-- line 34, "a'" s/b --$\underline{a}$'-- line 36, "b'" s/b --$\underline{b}$'-- line 44, "a" s/b --$\underline{a}$-- line 46, "a'" s/b --$\underline{a}$'--

UNITED STATES PATENT AND TRADEMARK OFFICE
CERTIFICATE OF CORRECTION

PATENT NO. : 4,747,157

DATED : May 24, 1988

INVENTOR(S) : Kurakake et al.

It is certified that error appears in the above-identified patent and that said Letters Patent is hereby corrected as shown below:

line 59, before "Input" insert --[--
        line 60, after "20" insert --]--
        line 67, "b" s/b --$\underline{b}$-- line 68, "c" s/b --"$\underline{c}$"

Col. 6, line 1, "d" s/b --$\underline{d}$-- line 2, "a" s/b --$\underline{a}$-- line 11, "a'" s/b --$\underline{a}$'-- line 15, "e" s/b --$\underline{e}$-- line 24, "b'" s/b --$\underline{b}$'-- line 25, "incremented" s/b --increments--
        line 26, "b" s/b --$\underline{b}$-- line 27, "a" s/b --$\underline{a}$-- line 37, "f" a/b --$\underline{f}$-- line 44, before "Storage" insert --[--
        line 45, after "22" insert --]--
        line 53, before "Execution" insert --[--
                after "calculation" insert --]--

UNITED STATES PATENT AND TRADEMARK OFFICE
CERTIFICATE OF CORRECTION

PATENT NO. : 4,747,157   Page 3 of 3
DATED : May 24, 1988
INVENTOR(S) : Kurakake et al.

It is certified that error appears in the above-identified patent and that said Letters Patent is hereby corrected as shown below:

```
Col. 7, line 4,  before "Referring" insert --[--
                 after "4:" insert --]--
        line 30, "SLCK2" s/b --SCLK2--
        line 59, before "Referring" insert --[--
                 after "5:" insert --]--
Col. 8, line 30, before "Referring" insert --[--
                 after "6:" insert --]--
        line 42, "controlled" s/b --controller--
        line 53, "in" s/b --is--
Col. 9, line 22, "f" s/b --f-- line 24, before "Recognition" insert --[--
        line 25, after "26" insert --]--
        line 31, "thereform" s/b --therefrom--
```

Signed and Sealed this

Fifteenth Day of November, 1988

*Attest:*

DONALD J. QUIGG

*Attesting Officer*   *Commissioner of Patents and Trademarks*